84-1.24 AJ 215 EX
6/30/87 OR RE 32,445

United States Patent [19]

Suzuki

[11] E Patent Number: Re. 32,445

[45] Reissued Date of Patent: Jun. 30, 1987

[54] ELECTRONIC MUSICAL INSTRUMENT HAVING PORTAMENTO PROPERTY

[75] Inventor: Hideo Suzuki, Hamamatsu, Japan

[73] Assignee: Nippon Gakki Seizo Kabushiki Kaisha, Japan

[21] Appl. No.: 784,150

[22] Filed: Oct. 4, 1985

Related U.S. Patent Documents

Reissue of:

[64] Patent No.: 4,408,514
Issued: Oct. 11, 1983
Appl. No.: 908,489
Filed: May 22, 1978

U.S. Applications:

[63] Continuation of Ser. No. 807,084, Jun. 6, 1977, abandoned.

[30] Foreign Application Priority Data

Jun. 25, 1976 [JP] Japan ..... 51-75067

[51] Int. Cl.[4] ..... G10H 1/02

[52] U.S. Cl. ..... 84/1.24; 84/1.01; 84/1.26; 84/DIG. 20

[58] Field of Search ..... 84/1.01, 1.24, 1.26, 84/DIG. 20

[56] References Cited

U.S. PATENT DOCUMENTS

| | | | |
|---|---|---|---|
| 3,789,718 | 2/1974 | Bunger | 84/1.01 |
| 3,828,110 | 8/1974 | Colin | 84/DIG. 20 X |
| 3,872,764 | 3/1975 | Munch et al. | 84/1.01 |
| 3,880,039 | 4/1975 | Studer | 84/DIG. 20 X |
| 3,886,836 | 6/1975 | Hiyoshi | 84/1.26 |
| 3,948,139 | 4/1976 | Melcher et al. | 84/DIG. 20 X |

*Primary Examiner*—Stanley J. Witkowski
*Attorney, Agent, or Firm*—Townsend & Townsend

[57] ABSTRACT

In a electronic musical instrument wherein a portamento is played by supplying the pitch voltage corresponding to a subsequently depressed key to a capacitor holding the pitch voltage corresponding to a previously depressed key, the charge and discharge currents of the capacitor corresponding to the difference between the two pitch voltages are controlled to vary exponentially thus changing exponentially the capacitor terminal voltage. The terminal voltage of the capacitor is applied to drive a voltage controlled oscillator to vary its oscillation frequency. To vary exponentially the terminal voltage of the capacitor, a mutual conductance converter is connected between the capacitor and a keyboard section and the output current from the mutual conductance converter is controlled by a control signal corresponding to the terminal voltage of the capacitor.

12 Claims, 11 Drawing Figures

FIG.5
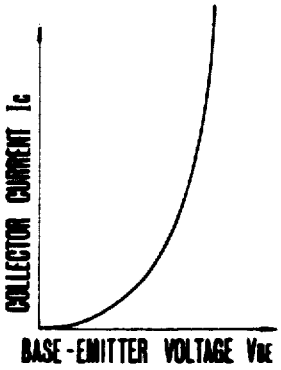
FIG.6A
FIG.6B
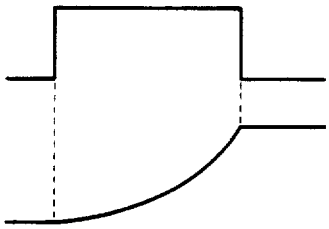
FIG.7A
FIG.7B
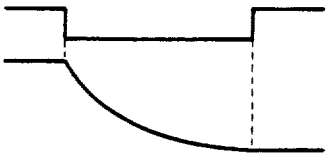
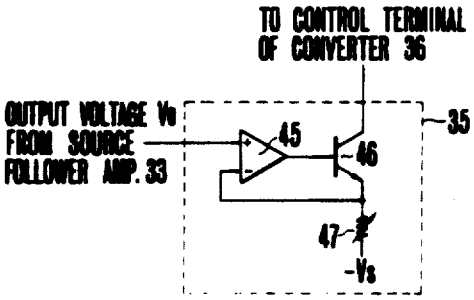
FIG.9

ELECTRONIC MUSICAL INSTRUMENT HAVING PORTAMENTO PROPERTY

Matter enclosed in heavy brackets [ ] appears in the original patent but forms no part of this reissue specification; matter printed in italics indicates the additions made by reissue.

This is a continuation of application Ser. No. 807,084, filed June 6, 1977 now abandoned.

BACKGROUND OF THE INVENTION

This invention relates to an electronic musical instrument having a portamento property and capable of continuously varying the tone pitch from a frequency corresponding to the note of a first key to that corresponding to the note of the a second, subsequently operated, key.

A typical prior art electronic musical instrument having the portamento property is disclosed in U.S. Pat. No. 3,866,836 issued June 3, 1975. The basic construction of an electronic musical instrument of this type will be described with reference to FIG. 1 of the accompanying drawings. When a key of a keyboard section 11 is depressed there are produced a voltage signal KV (hereinafter termed a pitch voltage) corresponding to the pitch of the note of the operated key, and a pulse signal KS (hereinafter termed of keying signal) having a width corresponding to a period of time during which the key is depressed. The pitch voltage KV is applied to act as an oscillator driving signal to a voltage controlled type oscillator 17 (hereinafter called VCO) via voltage holding time constant circuit 12 comprising a switching element 13 in the form of a field effect transistor, a variable resistor 14, a capacitor 15 and a portamento property selection switch 16 connected in parallel with the variable resistor 14 for producing a tone source signal. The tone source signal is applied to a voltage controlled filter 18 (hereinafter termed VCF) to form a musical tone by coloring a tone. The tone signal produced by VCF 18 is subjected to the control of a musical tone level that is an envelope in a voltage controlled type variable gain amplifier 19 (hereinafter called VCA), and the output of this VCA is amplified by an amplifier 20 to produce a tone from a loudspeaker 21. The keying signal KS is applied as a driving signal to the voltage holding time constant circuit 12 which is used to hold the pitch voltage KV snd to impart the portamento property, and to control voltage generators 21, 22 and 23 (hereinafter termed CVG). In response to the keying signal KS generated by key, these control voltage generators CVG's generate time-variable control voltage signals controlled by a variety of parameters which are set in a parameter control voltage generator 24, and these control voltage signals are applied to VCO 17, VCF 18 and VCA 19 respectively. In the VCO 17, the oscillation frequency is finely varied in accordance with the control voltage signal from CVG 21, while in VCF 18, the cut-off frequency is varied to form a musical tone signal resembling a natural musical tone. The VCA 19 operates to form a musical tone envelope in accordance with a control wave signal. During the normal play the selection switch 16 of the voltage holding time constant circuit 12 is closed so as to apply the pitch voltage KV generated by a depressed key directly to VCO 17 via the selection switch 16 and to store the tone voltage KV in capacitor 15. The purpose of capacitor 15 is to hold the pitch voltage KV for obtaining a sustained tone after release of the key while the purpose of the switching element 13 is to prevent the discharge of the voltage held by the capacitor 15.

In an electronic musical instrument having the construction described above, where it is desired to provide a portamento property, the portamento property selection switch 16 is opened to charge the pitch voltage KV in capacitor 15 via variable resistor 14 so that the voltage applied to VCO 17 varies with a time constant determined by the variable resistor 14 and capacitor 15. A pitch voltage $KV_1$ corresponding to a previously depressed key (the first key) is stored in the capacitor 15 as shown in FIG. 2 and when a new pitch voltage $KV_2$ corresponding to a subsequently depressed key (the second key) is generated at time $t_1$, the terminal voltage of the capacitor 15 increases logarithmically as shown by a solid line in FIG. 2 at a speed corresponding to the time constant determined by the variable resistor 14 and capacitor 15. As a consequence, the oscillation frequency of VCO 17 varies continuously as shown by the solid line in FIG. 2, whereby the pitch varies continuously from the pitch of the first key to that of the second key. When the audiences hear such musical sound having the portamento property, since the pitch frequency of the tone source signal produced by the VCO 17 varies rapidly and then slowly as shown by the solid line curve shown in FIG. 2, it varies differently from the actual pitch variation in the natural portamento shown by dotted lines in FIG. 2 thus giving an unnatural feeling to the audiences.

SUMMARY OF THE INVENTION

Accordingly, it is an object of this invention to provide an improved electronic musical instrument capable of providing a portamento property whose pitch frequency varies like a natural sound.

According to this invention, when supplying a pitch voltage corresponding to a second key to a capacitor holding a pitch voltage corresponding to a first key, the charging and discharging currents of the capacitor are such that the current that charges the capacitor according to the difference between the two pitch voltages varies exponentially thereby causing the terminal voltage of the capacitor which drives a voltage controlled oscillator to vary exponentially.

For the purpose of exponentially varying the capacitor terminal voltage a mutual conductance converter is connected between the capacitor and the keyboard section and a detector is provided for detecting a control signal corresponding to the capacitor terminal voltage so as to control the output voltage of the mutual conductance converter by the control signal.

BRIEF DESCRIPTION OF THE DRAWINGS

In the accompanying drawings

FIG. 5 is a graph showing a collector current base-emitter voltage of a transistor useful to explain the operation of the converter;

FIGS. 6A and 6B are waveforms showing the input voltage to the converter and the terminal voltage of the capacitor shown in FIG. 3 where the pitch voltage of the second key is higher than that of the first key;

FIGS. 7A and 7B are waveforms showing the converter input voltage and the capacitor terminal voltage where the pitch voltage of the second key is lower than that of the first key;

FIG. 9 is a connection diagram showing another example of the current controlling circuit shown in FIG. 3.

DESCRIPTION OF THE PREFERRRED EMBODIMENTS

Figures 1, 2:
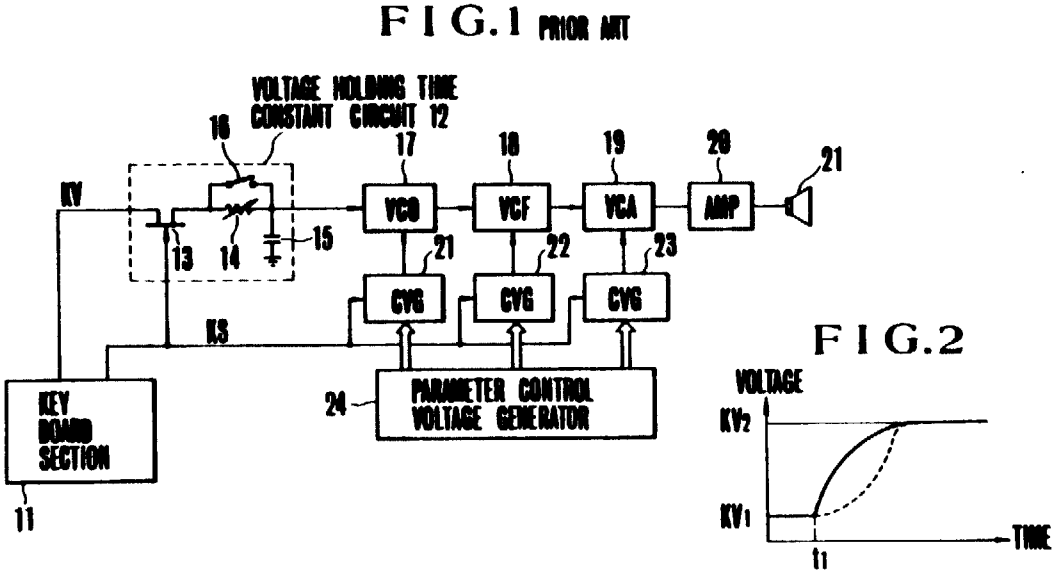
FIG. 1 PRIOR ART
FIG. 1 is block diagram showing the basic construction of a prior art electronic musical instrument having a portamento property.
FIG. 2 is a graph showing the pitch voltage variation produced by the capacitor shown in FIG. 1 and such variation in the natural portamento.

A preferred embodiment of the electronic musical instrument of the invention having a portamento property shown in FIG. 3 comprises a comparator 32 which compares the pitch voltage KV sent from the keyboard section 11 shown in FIG. 1 with the output voltage of a source follower amplifier 33 having a high input impedance and a low output impedance and also serving as a buffer circuit (described below) so that the comparator 32 produces a zero output when the pitch voltage KV coincides with the output voltage of the source follower amplifier 33. The pitch voltage KV is applied to the positive input terminal $32_a$ of the comparator 32, whereas the output voltage $V_0$ from the buffer circuit 33 is applied to the negative terminal (−). The comparator 32 is also supplied with source voltages $+V_s$ and $-V_s$. A resistance voltage divider 34 for dividing the output voltage of the comparator 32 is constituted by resistors $34_a$ and $34_b$ which are connected in series between the output terminal of the comparator 32 and ground potential. A current controlled mutual conductance converter 36 is provided for controlling the output voltage from the voltage divider 34 in accordance with a control current i produced by a current controlling circuit 35. The positive input terminal (+) of the converter 36 is connected to the junction between resistors $34_a$ and $34_b$ of the voltage divider 34, while the negative input terminal (−) is grounded via a resistor $36_a$. Source voltages $+V_s$ and $-V_s$ are also applied to the current controlled mutual conductance converter 36. The output terminal of this converter 36 is connected to one terminal of a capacitor 37, the other terminal of which is grounded. The source follower amplifier 33 adapted to amplify the terminal voltages of capacitor 37 includes a field effect transistor $33_a$ of a high input impedance having a drain electrode connected to the voltage source $+V_5$, and a source electrode connected to the voltage source $-V_s$ via a load resistor $33_b$. The output terminal $33_c$ connected to the source electrode is connected to the VCO 17 shown in FIG. 1. The current controlling circuit 35 for producing the control current i corresponding to the output voltage from the source follower amplifier 33 supplies the control current i to the control terminal $36_b$ of the current controlled mutual conductance converter 36. The current controlling circuit 35 includes a transistor $35_a$ having an emitter electrode connected to the output terminal $33_c$ of the source follower amplifier 33 via a variable resistor $35_b$, a collector electrode connected to the control terminal $36_b$ of the current controlled conductance converter 36 and a base electrode connected to the voltage source $-V_s$ via a resistor $35_c$ and to the ground through a diode $35_d$. The variable resistor $35_b$ varies the control current i for the purpose hereinafter described.

Figure 4:
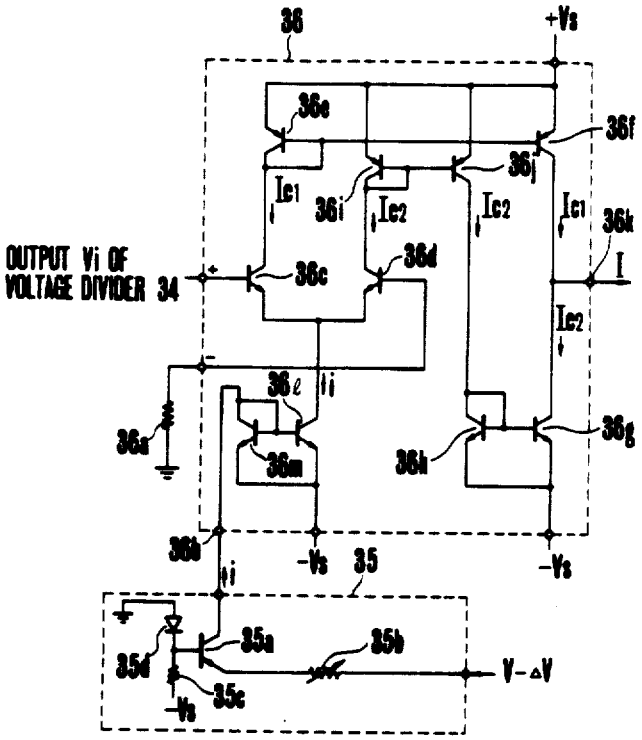
FIG. 4 is a connection diagram showing one example of the current controlled mutual conductance converter and of the current controlling circuit shown in FIG. 3.

FIG. 4 shows one example of the current control circuit 35 and the current controlled mutual conductance converter 36 described above. As shown the converter 36 comprises a pair of NPN type transistors $36_c$ and $36_d$ with their emitter electrodes connected together so as to constitute a differential amplifier. The base electrode of the transistor $36_c$ is connected to receive the output voltage $V_i$ of the voltage divider 34 via positive input terminal (+). The base electrode of transistor $36_d$ is connected to one terminal of a resistor $36_a$ via the negative input terminal (−). The commonly connected emitter electrodes of transistors $36_c$ and $36_d$ are connected to the collector electrode of a transistor $36_l$ which constitutes a current mirror circuit together with a transistor $36_m$. The collector electrode of the transistor $36_m$ is supplied with the output current of the current controlling circuit 35, that is the collector current of the transistor $35_a$ via control terminal $36_b$ which acts as the control current i for the converter 36. Since a fixed bias voltage is applied to the base electrode of transistor $35_a$, the current i varies in accordance with the input to the current controlling circuit 35, that is the output $V_0$ of the source follower amplifier 33. Accordingly, a portion of the control current i proportional to the input $V_0$ to the current controlling circuit 35 flows through the collector electrodes of transistors $36_c$ and $36_d$ as the collector currents $I_{c1}$ and $I_{c2}$. The same current as the collector current $I_{c1}$ of the transistor $36_c$ flows to the collector electrode of a transistor $36_f$ through PNP transistors $36_e$ and $36_f$ and NPN transistors $36_g$ and $36_h$ which constitute a current mirror. Similarly, the same current as the collector current $I_{c2}$ of the transistor $36_d$ flows to the collector electrode of a transistor $36_j$ through PNP transistors $36_i$ and $36_j$ which constitute a current mirror. The output terminal $36_k$ of the converter 36 is connected to the juncture between the collector electrodes of transistors $36_f$ and $36_g$. Consequently, the output current I derived out from the output terminal $36_k$ is expressed by an equation $I=I_{c1}-I_{c2}$. When an input $V_i$ is not supplied to the base electrode of the transistor $36_c$ via the positive input terminal (+) $I_{c1}=i_{c2}=i/2$ so that the output current I is zero. The collector current i/2 at this time represents the operating point of the converter 36 and as the input $V_i$ is applied the collector current $I_{c1}$ varies about the operating point and twice of the variation is taken out as the output current I of the converter 36.

In this manner, the mutual conductance gm of the converter 36 is determined by the collector currents of transistors $36_c$ and $36_d$. More particularly, the relationship between the collector current $I_{c1}$ of transistor $36_c$ and the base-emitter voltage $V_{BE}$ thereof represents the forward characteristic of a diode as shown in FIG. 5. For this reason, the collector current $I_{c1}$ of transistor $36_c$ is expressed by an equation $$I_{c1}=I_0(\exp HV_{BE}-1) \quad (1)$$

where $I_0$ represents the saturation current, and H a constant. Since the mutual conductance gm is equal to current $I_{c1}$ differentiated with respect to the voltage $V_{BE}$, $$gm = \frac{dI_{c1}}{dV_{BE}} = I_0 \cdot H \cdot \exp HV_{BE}. \quad 2$$

Since exp $HV_{BE} >> 1$, the mutual conductance gm can be expressed as follows because it is substantially proportional to the collector current $I_{c1}$ which in turn is proportional to i/2 and because i/2 is proportional to the control voltage $V_0$ of the current controlling circuit;

$$gmaI_{C1}ai/2 > V_0.$$

Thus the mutual conductance can be variably controlled by the control voltage $V_0$.

The electronic musical instrument having the portamento property and constructed as above described operates as follows.

Under a condition wherein capacitor 37 is charged to a voltage V and holds voltage $V_0$ at the output terminal $33_c$, when a pitch voltage KV is impressed upon the input terminal $32_a$ of the comparator 32 it produces the difference between the pitch voltage KV and the capacitor voltage V, which is applied to the voltage divider 34. Denoting the partial voltage produced by the voltage divider 34 by $V_i$ and the control current produced by the current controlling circuit 35 by i, the output current I produced by the current controlled mutual conductance converter 36 is expressed by the following equation $$I = B.V_i.i \quad (3)$$

where B represents a constant. The control current i produced by the current controlling circuit 35 is expressed by the following equation.

$$i = \frac{V - \Delta V}{R} = \frac{V}{R} - \frac{\Delta V}{R} = K'V - A' \quad 4$$

where R represents the resistance value of the variable resistor $35_b$, and $V_0 = V - \Delta V$ represents the output voltage of the source follower amplifier 33, V the charged voltage of capacitor 15, $\Delta V$ the gate-source voltage $V_{GS}$ of the transistor $33_a$ and K' and A' constants. By substituting equation 4 into equation 3, the equation of the output current I is modified as follows.

$$I = B.V_i.(K'V - A') = K''V - A'' \quad (5)$$

where K'' and A'' represent constants. The terminal voltage V of the capacitor 37 is expressed as follows.

$$V = 1/c \int I dt \quad (6)$$

where C represents the capacitance of the capacitor 37.

By differentiating the both sides of equation 6, we obtain $$\frac{dv}{dt} = \frac{I}{c} \quad 7$$

Substituting equation 5 into equation 7

$$\frac{dv}{dt} = \frac{K''}{c} V - \frac{A''}{c} = KV - A$$

where K and A represent constants. By modifying this equation, we obtain $$\frac{dV}{V - \frac{A}{K}} = kdt \quad 8$$

By solving this differential equation, we obtain $$V = F \exp[Kt] + \frac{A}{K} \quad 9$$

where F represents a constant.

As above described, according to this invention, the terminal voltage V of capacitor 37 is amplified by the source follower amplifier 33 having a gain G=1, the output voltage $V_0$ at the output terminal $33_c$ of the amplifier is converted into a control current i having a magnitude corresponding to the output voltage $V_0$ by the current controlling circuit 35 and the control current i is used to control the output current I of the current controlled mutual conductance converter 36 so that the charging current (output current I) flowing through the capacitor 37 varies exponentially, that is when the control current i is small the output current I varies in a correspondingly small manner but when the control current i is large, the output current I varies in a correspondingly large manner. Consequently, during the portamento play, while the pitch voltage $KV_1$ corresponding to the first key is being held by capacitor 37, when the pitch voltage $KV_2$ corresponding to the second key is applied to the positive input terminal $32_a$ of the comparator 32 the pitch voltage $KV_2$ is compared with $(KV_i - \Delta V)$ by comparator 32 and its differential output is applied to the voltage divider 34 thus producing a partial pulse voltage $V_{i2}$ as shown in FIG. 6A. This pulse voltage $V_{i2}$ is applied to the positive input terminal of the current controlled mutual conductance converter 36.

At this time, the control current i applied to the control terminal $36_d$ of the converter 36 from the current controlling circuit 35 is small at first but increases gradually thus controlling the output current I to increase exponentially. Accordingly, the terminal voltage V of capacitor 37 charged with this output current I varies exponentially as shown in FIG. 6B until a steady state is reached at which the voltage V becomes equal to the applied pitch voltage $KV_2$. Thereafter, since the output of the comparator 32 is zero, this voltage is held. Accordingly, the source follower amplifier 33 produces an output voltage $V_0$ having the same waveform as the terminal voltage V of the capacitor 37 at its output terminal $33_c$ which is supplied to the VCO 17 shown in FIG. 1. Thus, the VCO 17 continuously produces a tone source signal having a frequency corresponding to the variation in the voltage applied thereto thus manifesting the portamento property. According to this invention, as shown in FIG. 6B, the voltage wave supplied to the VCO 17 closely approximates the pitch variation in the natural portamento (see the dotted line characteristics shown in FIG. 2), and the listeners perceive a natural portamento.

If the control current i of the current controlling circuit 35 is varied by adjusting the variable resistor $35_b$, the variation inclination of the converter output current I is changed accordingly so that the charging speed of the capacitor 37 is controlled. Thus, the tempo of portamento, i.e. the time for continuously changing a tone from one note to the other is controlled.

Where the relative magnitude of the pitch voltages produced by the first and second keys is opposite to that described above, the charge accumulated in capacitor 37 at the time of operating the first key discharges through the current controlled mutual conductance converter 36 so that the terminal voltage of the capacitor 37 decreases as above described. More particularly, when the partial voltage shown in FIG. 7A is impressed upon the positive input terminal of the current controlled mutual conductance converter 36, the terminal voltage of the capacitor 37 decreases exponentially as shown in FIG. 7B, thus producing a portamento tone ranging between from a high pitch to a low pitch.

Figure 3:
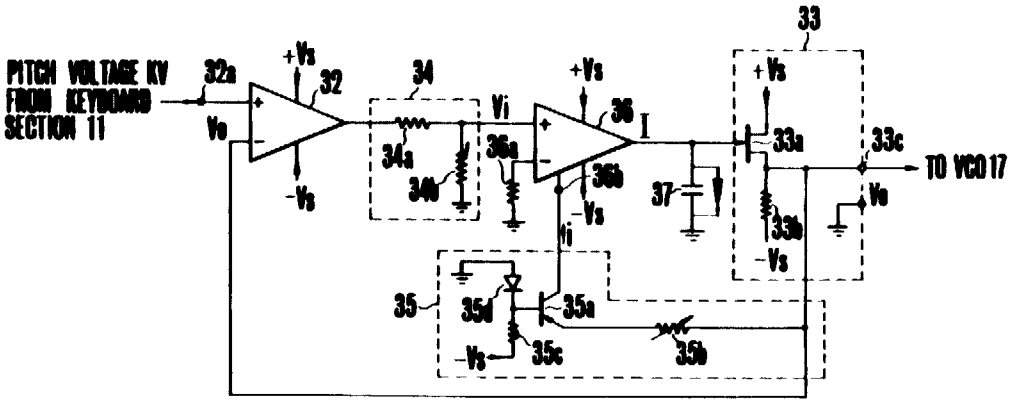
FIG. 3 is a connection diagram showing one embodiment of the novel electronic musical instrument of this invention and having a portamento property.
Figure 8:
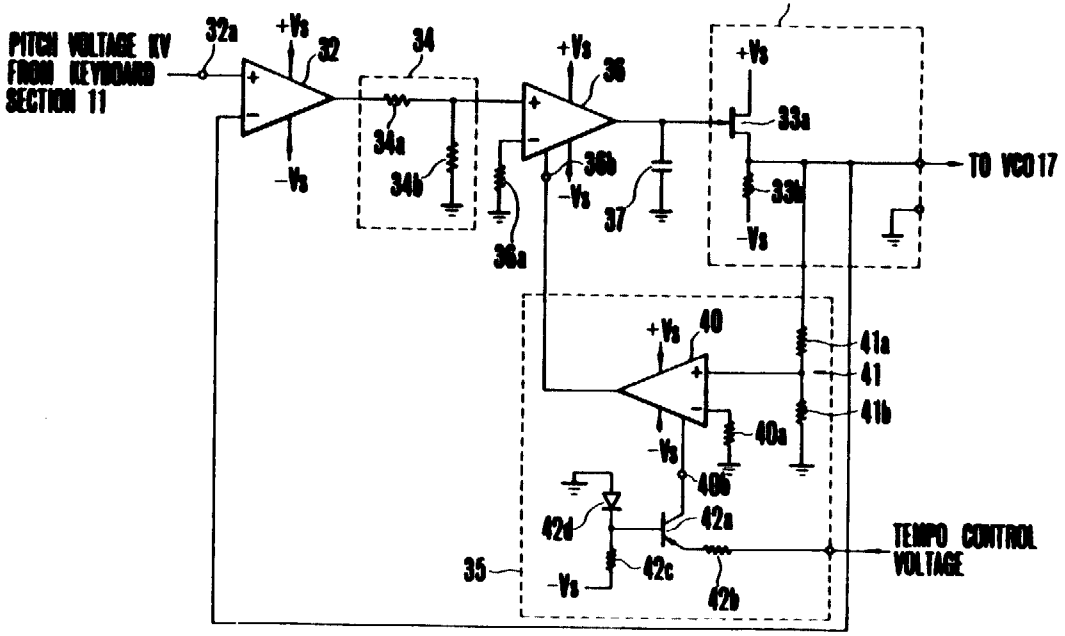
FIG. 8 is a connection diagram showing a modified embodiment of this invention.

FIG. 8 shows a modified embodiment of the electronic musical instrument having a portamento property in which elements corresponding to those shown in FIG. 3 are designated by the same reference characters. This modification differs from that shown in FIG. 3 in the following points, that is the control current i is controlled by the output voltage from the source follower amplifier 33 and a tempo control voltage. In other words, in this embodiment, the tempo of portamento is controlled by voltage in contrast to the embodiment shown in FIG. 3 where it is controlled by current. For this reason, a current controlled mutual conductance converter 40 having the same construction as the converter 36 is included in the current controlling circuit 35. The positive input terminal (+) of the converter 40 is connected to receive a fractional portion of the output voltage $V_0$ of the source follower amplifier 33 which is produced by a voltage divider 41 comprising resistors $41_a$ and $41_b$, whereas the negative input terminal of the converter 40 is grounded through a resistor $40_a$. The control terminal $40_b$ of the converter 40 is connected to receive the output of the collector electrode of a transistor $42_a$. The emitter electrode of this transistor $42_a$ is connected to receive, via a resistor $42_b$, a tempo control voltage generated by a potentiometer (not shown) which is, for example, interlocked with a tempo control member mounted on a control panel of the electronic musical instrument. The base electrode of the transistor $42_a$ is connected to the voltage source $-V_s$ via a resistor $42_c$ and to ground through a diode $42_d$. Consequently, the output current from the current controlling circuit 35 varies in proportion to the tempo control voltage. As can be clearly noted from the foregoing description, the output current from the current controlled mutual conductance converter 40 corresponds to both the output voltage of the source follower amplifier 33 and the tempo control voltage, and this output current is applied to the control terminal $36_b$ of the current controlled mutual conductance converter 36 to act as the control current i. With the portamento playing instrument described above it is possible to adjust the charging and discharging speed of the capacitor 37 by adjusting the tempo control voltage, thereby to control the tempo of portamento.

In the foregoing embodiments the differential output between the pitch voltages of the first and second keys and produced by the comparator 32 is applied to the current controlled mutual conductance converter 36 and when the terminal voltage of the capacitor 37 charged by the output current of the converter 36 becomes equal to an applied pitch voltage the differential output of the comparator 32 becomes zero so that the charging of the capacitor 37 is terminated. It is, however, also possible to interrupt the charging circuit of the capacitor 37 from the converter 36 when the terminal voltage of the capacitor 37 becomes equal to the applied pitch voltage where the pitch voltage is applied directly to the converter 36.

The construction of the current controlled mutual conductance converters 36 and 40 is not limited to that shown in FIG. 4 but various other types may be used. For example, a CA3080 type linear integrated circuit made by Radio Corporation of America may be used.

The current controlling circuit 35 for producing the control signal applied to the current controlled mutual conductance circuit may be a circuit as shown in FIG. 9. In FIG. 9, the output voltage $V_0$ of the source follower amplifier circuit 33 is applied to the positive input terminal of an operational amplifier 45 and the output thereof is applied to the base electrode of a NPN transistor 46. The emitter electrode of this transistor is connected to the voltage source $-V_s$ via a variable resistor 47 and to the negative input terminal of the amplifier 45. The collector electrode of the transistor 46 is connected to a current mirror circuit (not shown) so that a current corresponding to the collector current in the transistor 46 is applied to the control terminal $36_b$ of the converter 36. With this arrangement, the voltage to the negative input terminal of the amplifier 45, that is the emitter voltage of the transistor 46 becomes equal to the voltage $V_0$. Therefore a current determined by $(V_0-V_s)/R_{47}$ flows to the collector electrode of the transistor 46 where $R_{47}$ represents a resistance value of the resistor 47.

Although the mutual conductance converter 36 has been shown and described as being controlled by an independent current, controlling circuit these elements can be combined into a unitary element. Then the converter may be changed to a voltage controlled type.

It is also to be understood that the mutual conductance, converter 36 can be constituted by three terminal active elements, such as a field effect transistor, and a bipolar transistor. In this case, the input terminal of the converter is supplied with the pitch voltage from the keyboard section 11 and one of the inputs is connected to receive a feedback voltage of the output voltage corresponding to the terminal voltage of capacitor 15.

As above described according to the portamento playing instrument of this invention the charging current of a capacitor which holds the pitch voltage at the time of playing a portamento is controlled to be varied exponentially and the terminal voltage of the capacitor is used to drive a voltage controlled type oscillator which serves as the tone source circuit as that the frequency of the tone source signal generated by the voltage controlled type oscillator varies exponentially thus closely approximating the frequency variation in the natural portamento. Accordingly, it is possible to play the natural portamento by an electronic musical instrument.

It should be understood that the invention is not limited to the specific embodiments described above and that many changes and modifications will be obvious to one skilled in the art.

What is claimed is:

1. In an electronic musical instrument including a capacitor which is charged with a pitch voltage to hold the same, and a voltage controlled type oscillator which is controlled by the terminal voltage of said capacitor for playing a portamento, the improvement which comprises a first mutual conductance converter responsive to an input voltage signal to produce a current signal for varying said capacitor terminal voltage, means for supplying the current signal of said mutual conductance converter to said capacitor, means for detecting said capacitor terminal voltage to produce a control voltage signal corresponding to said capacitor terminal voltage, means coupled to said mutual conductance converter and said detecting means for controlling the current signal of said mutual conductance converter in accordance with said control voltage signal so that said current signal is substantially directly proportional to said capacitor terminal voltage thereby causing said capacitor terminal voltage to vary exponentially with respect to time both in ascending and descending characteristics, and a comparator responsive to said pitch voltage and said capacitor terminal voltage for delivering to said mutual conductance converter an output voltage signal as said input voltage signal to said converter when said capacitor terminal voltage is in a predetermined relation in magnitude to said pitch voltage, said voltage controlled type oscillator having a substantially linear input-output characteristic thereby producing a tone signal having a frequency varying exponentially with respect to time in said both characteristics.

2. The electronic musical instrument according to claim 1 wherein said mutual conductance converter is of a current controlled type.

3. The electronic musical instrument according to claim 2 wherein said mutual conductance converter comprises first and second transistors with their emitter electrodes commonly connected so as to constitute a differential amplifier, first and second current mirror circuits for deriving out a current variation corresponding to the collector currents of said transistors, a circuit for deriving out the difference between the output currents from said first and second current mirror circuits as said current signal, and a circuit for applying a control current corresponding to said control voltage signal to the emitter electrodes of said first and second transistors.

4. The electronic musical instrument according to claim 4 wherein said current signal control means is connected to supply to said mutual conductance converter a control current corresponding to the control voltage signal of said detecting means which is proportional to the terminal voltage of said capacitor.

5. The electronic musical instrument according to claim 5 wherein said current signal control means comprises a bipolar transistor with its base electrode supplied with a fixed bias potential, the emitter electrode supplied with the output control voltage signal from said detecting means, and the collector electrode connected to supply a collector current proportional to said control voltage signal to said mutual conductance converter.

6. The electronic musical instrument according to claim 5 wherein said current signal control means further comprises a variable resistor connected between said detecting means and the emitter electrode of said bipolar transistor to control a tempo of the portamento.

7. The electronic musical instrument according to claim 4 wherein said current signal control means comprises a bipolar transistor and an amplifier, and wherein the control voltage signal from said detecting means is applied to the base electrode of said bipolar transistor via said amplifier, the emitter electrode of said transistor is connected to a source through a load, and the collector electrode is connected to apply the collector current corresponding to the control voltage signal to said mutual conductance converter.

8. The electronic musical instrument according to claim 1 wherein said detecting means includes a buffer circuit having a high input impedance and a low output impedance, the terminal voltage of said capacitor is applied to the input of said buffer circuit and the output from said buffer circuit, is applied to said current signal control means.

9. The electronic musical instrument according to claim 8 wherein said buffer circuit comprises a source follower amplifier including a field effect transistor.

10. The electronic musical instrument according to claim 1 which further comprises a voltage dividing circuit connected between said comparator and said mutual conductance converter.

11. The electronic musical instrument according to claim 1 wherein said current signal control means comprises a second mutual conductance converter connected to receive the control voltage signal from said detecting means, a current controlling circuit for supplying to said second mutual conductance converter a control signal corresponding to a portamento tempo control voltage, and means for applying to said first mutual conductance converter the output from said second mutual conductance converter to act as the control signal for the first mutual conductance converter thereby controlling the output current signal of the first mutual conductance converter in accordance with said tempo control voltage.

*12. In an electronic musical instrument including a capacitor which is charged with a pitch voltage signal to hold the same, and a voltage controlled type oscillator which is controlled by the terminal voltage of said capacitor for playing a portamento, the improvement which comprises means responsive to said pitch voltage signal for generating a current signal to vary said capacitor terminal voltage exponentially through charging and discharging said capacitor in accordance with said current signal, means for detecting said capacitor terminal voltage to produce a control signal, means coupled to said current signal generating means for controlling the same in response to said control signal so that said current signal increases and decreases in magnitude when said capacitor terminal voltage increases and decreases exponentially, respectively, and means for causing said current signal generating means to cease from generating said current when said capacitor terminal voltage is in a predetermined relation in magnitude to said pitch voltage signal.*

* * * * *